United States Patent [19]

Russell et al.

[11] Patent Number: 4,972,767
[45] Date of Patent: * Nov. 27, 1990

[54] TOASTER

[75] Inventors: Gordon K. Russell, 1 Richview Rd., Apt. 1101B, Etobicoke, Ontario, Canada, M9N 4M6; Donald Taylor, Mississauga; Clement Ching, Scarborough; Kam-Chuen Chan, Richmond, all of Canada

[73] Assignee: Gordon K. Russell, Etobicoke, Canada

[*] Notice: The portion of the term of this patent subsequent to Nov. 27, 2007 has been disclaimed.

[21] Appl. No.: 360,800

[22] Filed: Jun. 2, 1989

Related U.S. Application Data

[63] Continuation of Ser. No. 301,920, Jan. 26, 1989, Pat. No. 4,901,631.

[51] Int. Cl.⁵ .................. A47J 27/12; A47J 37/08
[52] U.S. Cl. .................................... 99/339; 99/441
[58] Field of Search .................. 99/339, 441, 446, 447, 99/329, 327, 385, 393, 400, 401, 420, 427, 448; 219/521, 538

[56] References Cited

U.S. PATENT DOCUMENTS

| | | | |
|---|---|---|---|
| 1,971,012 | 8/1934 | Macdonald | 99/441 |
| 2,329,937 | 9/1943 | Orkfritz | 219/19 |
| 2,374,302 | 4/1945 | Orkfritz | 99/392 |
| 2,470,548 | 5/1949 | Desjardins | 99/336 |
| 2,497,205 | 2/1950 | Brewton | 99/391 |
| 2,561,538 | 7/1951 | Schultz | 99/420 |
| 2,630,062 | 3/1953 | Litt . | |
| 2,636,431 | 4/1953 | Baltz et al. | 99/339 |
| 2,634,749 | 4/1953 | Cone | 99/339 |
| 2,639,657 | 5/1953 | Lawson | 99/336 |
| 2,664,495 | 12/1953 | Wehrli | 219/43 |
| 2,674,938 | 4/1954 | Tagliaferri | 99/336 |
| 2,689,517 | 9/1954 | Angelus | 99/345 |
| 2,716,697 | 8/1955 | Grannan | 219/37 |
| 2,913,976 | 11/1959 | Cole | 99/327 |
| 2,915,000 | 12/1959 | Hetzel | 99/327 |
| 2,925,771 | 2/1960 | Avetta | 99/393 |
| 2,941,463 | 6/1960 | Cuia | 99/393 |
| 3,007,393 | 11/1961 | Le Doux | 99/127 |
| 3,065,688 | 11/1962 | Lindemann | 99/329 |
| 3,308,748 | 3/1967 | Jalbert | 99/402 |
| 3,391,633 | 7/1968 | Boosalis | 99/441 |
| 3,511,170 | 5/1970 | O'Connor . | |
| 3,669,002 | 6/1972 | Davidson | 99/393 |
| 3,747,507 | 7/1973 | McIntosh | 99/339 |
| 3,792,653 | 2/1974 | Davidson | 99/339 |
| 4,119,020 | 10/1978 | Sharp et al. | 219/521 |

FOREIGN PATENT DOCUMENTS 950522 7/1974 Canada .
950523 7/1974 Canada .

Primary Examiner—Timothy F. Simone
Attorney, Agent, or Firm—Rogers, Bereskin & Parr

[57] ABSTRACT

An elevator for a toaster is disclosed which has a first portion for supporting one or more frankfurters generally side by side between an opposed pair of heating elements in the toaster. The elevator includes a second portion for supporting one or more buns one in each bun heating chamber each bun being adjacent to a single heating element. The frankfurters are heated on two sides where the buns are heated on only one side. The side by side orientation of the first portion is at right angles to an axis formed between two of the buns when the buns are supported in the bun heating chamber by the second portion. In another aspect of the invention a toaster is provided which includes a frankfurter heating chamber, at least one bun heating chamber, and at least one heating element interposed between the frankfurter heating chamber and the bun heating chamber. The heating element simultaneously heating both the frankfurter and the bun. Also provided in this embodiment is an elevator for supporting the frankfurter and the bun in their respective chamber. The elevator can be raised or lowered within the toaster.

16 Claims, 7 Drawing Sheets

TOASTER

FIELD OF THE INVENTION

This application is a continuation of application Ser. No. 07/301,920, filed Jan. 26, 1989, U.S. Pat. No. 4,901,631.

This invention relates to a self-contained cooking appliance of the type used for toasting articles of food therein. In particular, this invention relates to a toaster suitable for toasting frankfurters and associated buns.

BACKGROUND OF THE INVENTION

Frankfurters have been known and used in commerce extensively for a long time. They are a particularly popular snack food in North America. In the past, there have been numerous attempts to provide a suitable cooking appliance which will thoroughly cook a frankfurter with a minimum of time and inconvenience. Among the various frankfurter cooking devices suggested, are those of the type that pass an electrical current through the frankfurter thereby cookinq the frankfurter and those of the type that employ radiant heating elements which provide heat to toast the frankfurter which is exposed to the heat from such elements. It has been found that the passing of an electrical current through the body of the frankfurter creates a dangerous and unsafe cooking device. Such a device is unsafe because if the device is turned on, without a frankfurter being placed across the two electrodes providing the electricity, then it is possible that live electrodes could becomes exposed thereby creating a serious health risk. This is clearly a disadvantage to this type of cooker and therefore this type of cooker is generally undesirable.

A different problem arises with respect to radiant heating or toasting frankfurter cookers. An example of a radiant heating frankfurter toaster is disclosed in U.S. Pat. No. 3,792,653 which issued on Feb. 19, 1974, for an invention entitled A TOASTER in the name of Brian Davidson. This patent discloses a toaster which simultaneously heats a bun and a frankfurter. In their uncooked state, frankfurters are generally symmetrical, elongate cylinders with rounded ends. However, under the influence of the radiant heat from the toasting elements, the frankfurters typically will bend away from the longitudinal axis depending upon how much heat is directed to what portions of the frankfurter, the frankfurter will bend, curl or tend to split. The distortion of the frankfurter away from a generally symmetrical shape makes it very difficult to move the frankfurter in a direction along its longitudinal axis. A significant problem with respect to the device of this prior patent is the tendency of the frankfurter to deflect and jam in a frankfurter heating chamber.

BRIEF SUMMARY OF THE INVENTION

Therefore, according to the present invention there is provided an elevator for a toaster having both a frankfurter heating chamber and two bun heating chambers, the elevator comprising: a first portion for supporting at least two frankfurters generally side by side between an opposed pair of heating element means in the toaster, each frankfurter being heated on two opposed sides, and a second portion for supporting at least two buns, one in each bun heating chamber, each bun being adjacent a single heating element means, said buns being heated on only one face, said side by side orientation of said first portion being generally at right angles to an axis formed between two of said buns, one in each bun heating chamber, when supported by said second portion.

According to the present invention there is also provided a toaster for heating at least one frankfurter and an associated frankfurter bun, said toaster comprising: a frankfurter heating chamber for heating at least one frankfurter supported in said frankfurter heating chamber; at least one bun heating chamber for heating one face of a bun supported in said bun heating chamber; at least one heating element means being interposed between said frankfurter heating chamber and said bun heating chamber, and simultaneously heating both said frankfurter and said bun said heating element means directing more heat into said frankfurter heating chamber than in said bun heating chamber; an elevator comprising a first portion for supporting said frankfurter in said frankfurter heating chamber, and a second portion for supporting said bun in said bun heating chamber; and a means for raising and lowering said elevator, said elevator in a lower position supporting said frankfurter and said bun substantially within said respective frankfurter heating chamber and said bun heating chamber, and said elevator in said raised position supporting said frankfurter and said bun with at least a portion of said frankfurter and said bun projecting outwardly of said respective chambers.

BRIEF DESCRIPTION OF THE DRAWINGS

For better understanding of the present invention and to show more clearly how it may be carried into effect, reference will now be made, by way of example, to the accompanying drawings which show the preferred embodiments of the present invention and in which:

FIG. 1 shows at 10 a preferred form of toaster according to the present invention. The toaster 10 has an associated electrical cord 12 for providing power to the toaster 10 as described below. Also shown in FIG. 1 is a front 14, a left side 16 and a top 18. A bottom 20 together with a rear 15 and a right side 17 complete the toaster 10. On each of the left side 16 and the right side 17 are handles 20. A knob 22 forms a part of the handle 20. Also shown is a timer adjuster 24 with an associated dial 26. Turning now to the top 18 of the toaster 10 there are shown a frankfurter heating chamber 30 located between two opposed bun heating chambers 32 and 34. These heating chambers have respectively top openings 31, 33 and 35. Also shown on top 18 are safety catches 36 and 38 which are described in more detail below.

FIG. 2 shows an elevator 40 in exploded view out of the toaster 10. The elevator 40 comprises a first portion indicated generally at 42 for supporting a frankfurter in the frankfurter heating chamber 30 and a second portion 44 for supporting at least one bun in one of the bun heating chambers 32 or 34. In the embodiment shown in FIG. 2 the second portion 44 is comprised of a left-hand plate 46 and a right-hand plate 48. Also shown are respective tabs 47 and 49 extending upwardly from plates 46 and 48.

Figure 3:
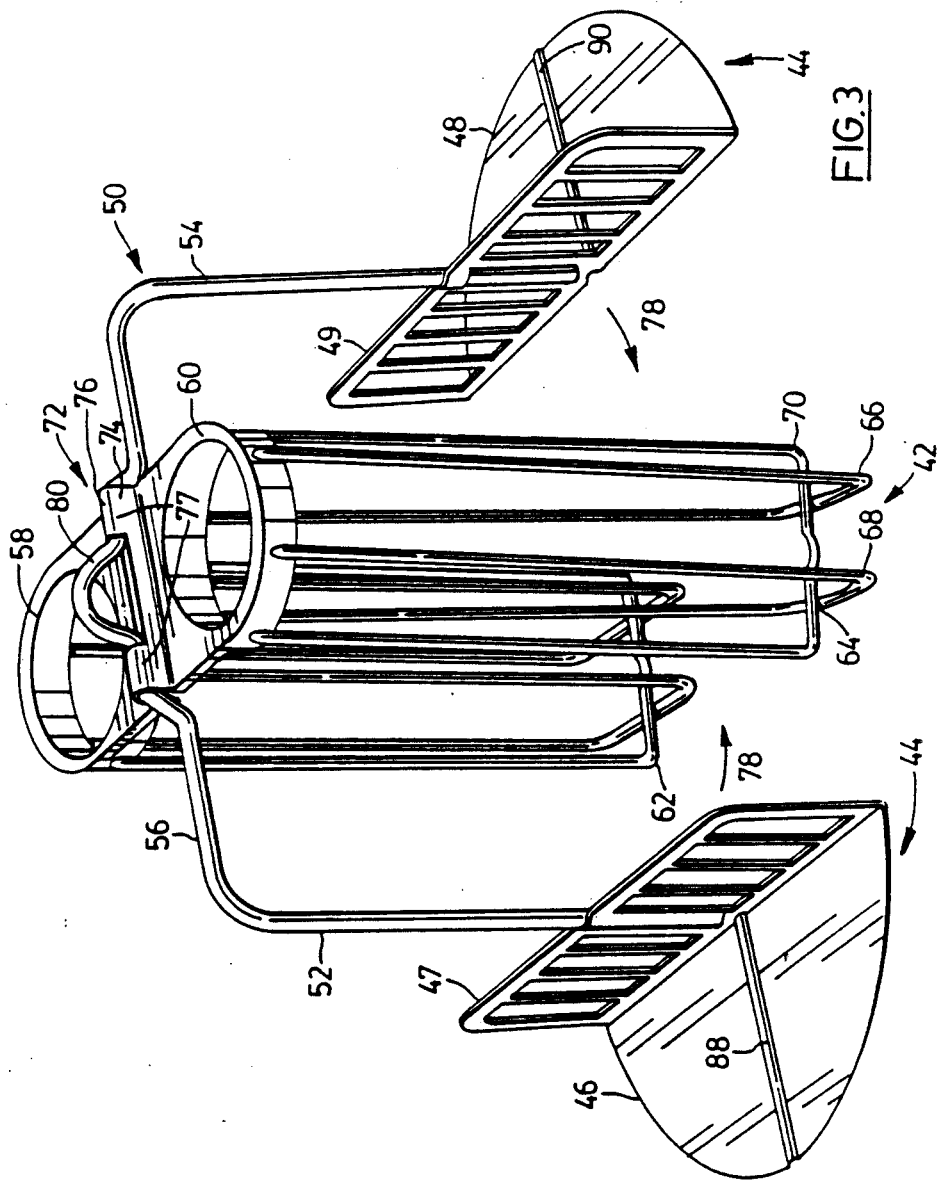
FIG. 3 is an enlarged view of the elevator of FIG. 2.

The elevator 40 is shown in enlarged view in FIG. 3. Connecting the first portion 42 to the second portion 44 is a link rod 50. The link rod 50 is generally in the shape of an upside down U and includes opposed generally vertical sections 52, 54 and an upper section 56 joining the two generally vertical sections 52, 54. The generally horizontal left-hand plate 46 is attached to generally vertical section 52 at upwardly extending tab 47. Similarly on the right-hand side, the generally horizontal right-hand plate 48 is joined to the generally vertical section 54 at the upwardly extending tab 49. These joints may be made rigid by any suitable means such as welding or the like.

Turning to the first portion 42 as shown in FIG. 3, there are a pair of opposed upper rings 58 and 60 having a frankfurter restraining cage 62 and 64 depending therefrom. Each frankfurter restraining cage 62, 64 is composed of three generally U-shaped members 66, 68 and 70. The following description is in respect of the cage 64, but it will be appreciated that the description applies equally to cage 62. The U-shaped members 66 and 68 lie in two parallel planes as shown in FIG. 3. The U-shaped member 70 lies in a plane generally perpendicular or orthogonal to the parallel planes of U-shaped members 66 and 68. In this manner the cage 62 is created for restraining the frankfurter (not shown) during the course of toasting the frankfurter. The cages 62, 64 simultaneously restrain any frankfurter placed therein, and allow radiant heat to impinge upon the frankfurter.

Also, as shown in FIG. 3, the upper rings 58 and 60 are attached to the link rod 50 in a manner shown at 72. Essentially, each upper ring 58 and 60 has an opposed upwardly extending flange. These flanges are shown as 74 and 76 in FIG. 3. The opposed flanges 74 and 76 are bent around the link rod 50 and each flange 74, 76 is secured to the opposite flange. The flanges 74, 76 are not secured to the link rod 50, so that the link rod 50 is free to move somewhat in a pair of channels 77 formed between the opposed flanges 74 and 76. In this manner, a limited amount of play is permitted between the first portion 42 and the second portion 44 as illustrated by arrows 78. It will be appreciated by those skilled in the art that such a limited amount of play provides certain inherent advantages. For example, the elevator 40 will not easily be susceptible to breakage since a limited amount of movement or play is permitted. This is especially advantageous when removing the elevator 40 from the toaster 10 to place it in a dishwasher or the like.

Also shown in FIG. 3 is a raised loop 80 formed in the upper section 56 of the link rod 50. The raised loop 80 is of sufficient size that a fork tang or the like may be inserted into the loop 80 to lift the elevator 40 out of the toaster 10.

Turning again to FIG. 2, it can be seen that channels 82 and 84 are formed between the top openings 31, 33 and 35. The channels 82, 84 accommodate the upper section 56 of the link rod 50 to allow the elevator 40 to be inserted into the toaster 10. Upon the elevator 40 being inserted into the toaster 10 the left-hand plate 46 and the right-hand plate 48 come into contact with and sit upon a generally horizontal bar 86. Grooves, indicated as 88 and 90, are formed in the left-hand plate 46 and the right-hand plate 48 to provide a secure seat on the bar 86.

Figure 5:
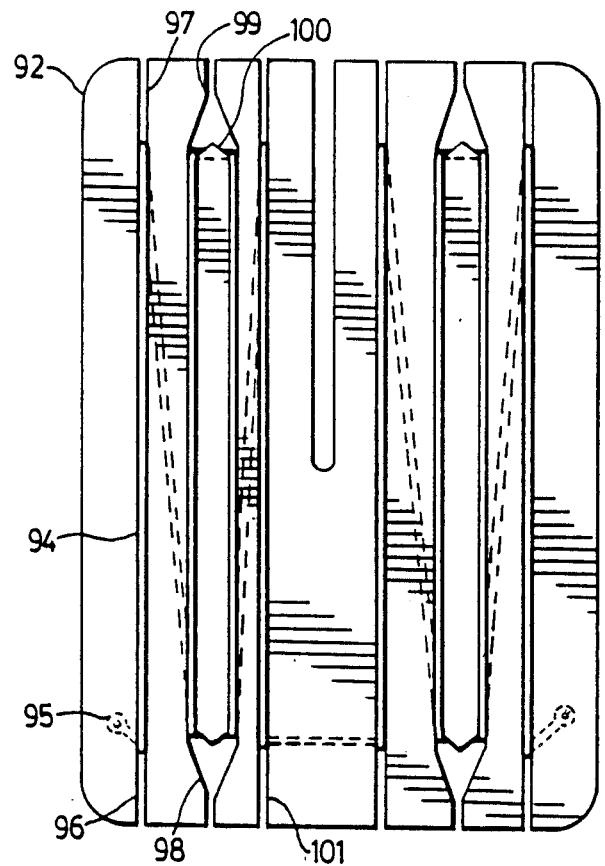
FIG. 5 is a plan view of an element of the toaster of FIG. 1.

Between the chambers 30 and 32 and between the chambers 30 and 34 are located vertical insulating panels 92, 93. Each vertical insulating panel has a face towards the inside of the frankfurter heating chamber 30 and each of the insulating panels 92, 93, has a face towards the inside of a bun heating chamber 30 or 34. Heating elements are provided on these faces to produce radiant heat. FIG. 5 shows the panel 92, looking at the face which is towards the inside of frankfurter heating chamber 30. The panel has an element 94, which is wound around the panel 92 as shown. Beginning at the left hand side, the element 94 is fixed at a point 95. It is then brought through a notch 96 and passes up the front face to a top notch 97. The element 94 then passes along the rear face downwardly to a notch 98. The element 94 then passes upwardly along the front face to a further notch 99. The notch 99 has an upwardly directed point 100 and the element 94 passes around the point 100 on the rear face, and then downwardly, along the front face to a further notch 100. The element 94 then passes across to the right hand half of the panel 92, across the rear face, and the pattern described above is repeated, in reverse order.

The panel 93 carries an element 94 in an identical manner to that described above in respect of panel 92. It will now be appreciated that because there are two panels 92, 93, the frankfurter heating chamber 30 is heated from opposed sides, while the bun heating chambers 32, 34 are only heated from one side.

It will be appreciated by those skilled in the art that a frankfurter requires more heat to become toasted, than does a bun. Further, the rate of toasting of either the frankfurter or the bun is dependent upon the amount of radiant heating impinging upon the bun or the frankfurter. The amount of radiant heating, in turn, is dependent upon the number of heating elements, and the distance the food is away from the heating elements. In order to provide for the simultaneous toasting of the bun and the frankfurter, and in order that the toasting of the bun and the frankfurter are completed simultaneously, a number of techniques have been utilized in the present invention. Firstly, in the bun heating chamber a spacing grill 102 is provided formed by a plurality of outwardly and then downwardly extending spacing elements 103. The grill 102 spaces the bun away from the elements 94, thereby slowing the rate of speed at which the bun toasts. Secondly, the bun heating chamber faces of the panels 92, 93 have only half of the elements as are provided on the frankfurter heating faces of panels 92, 93. This is illustrated in FIG. 5 where there are shown eight strips of element 94 on the front face (for the frankfurter heating chamber 30) and only four strips on the rear face (for the bun heating chamber 32 or 34).

Figure 1:
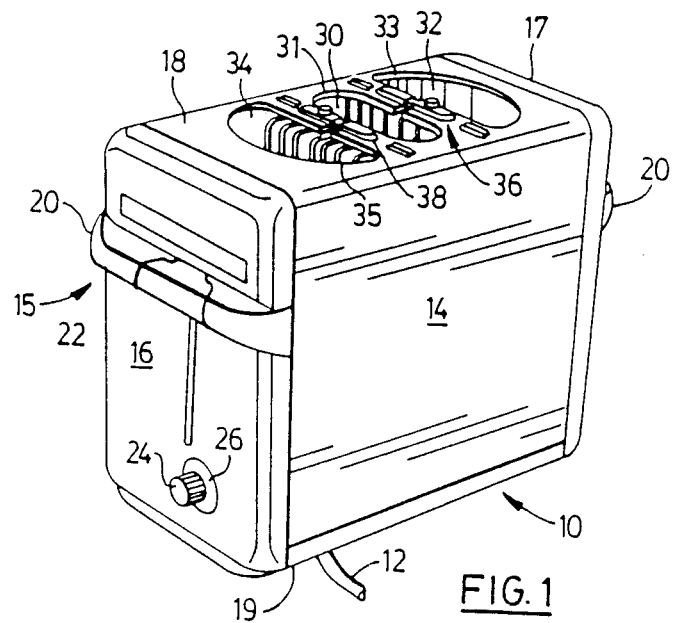
FIG. 1 is a perspective view of a toaster according to the present invention.
Figure 2:
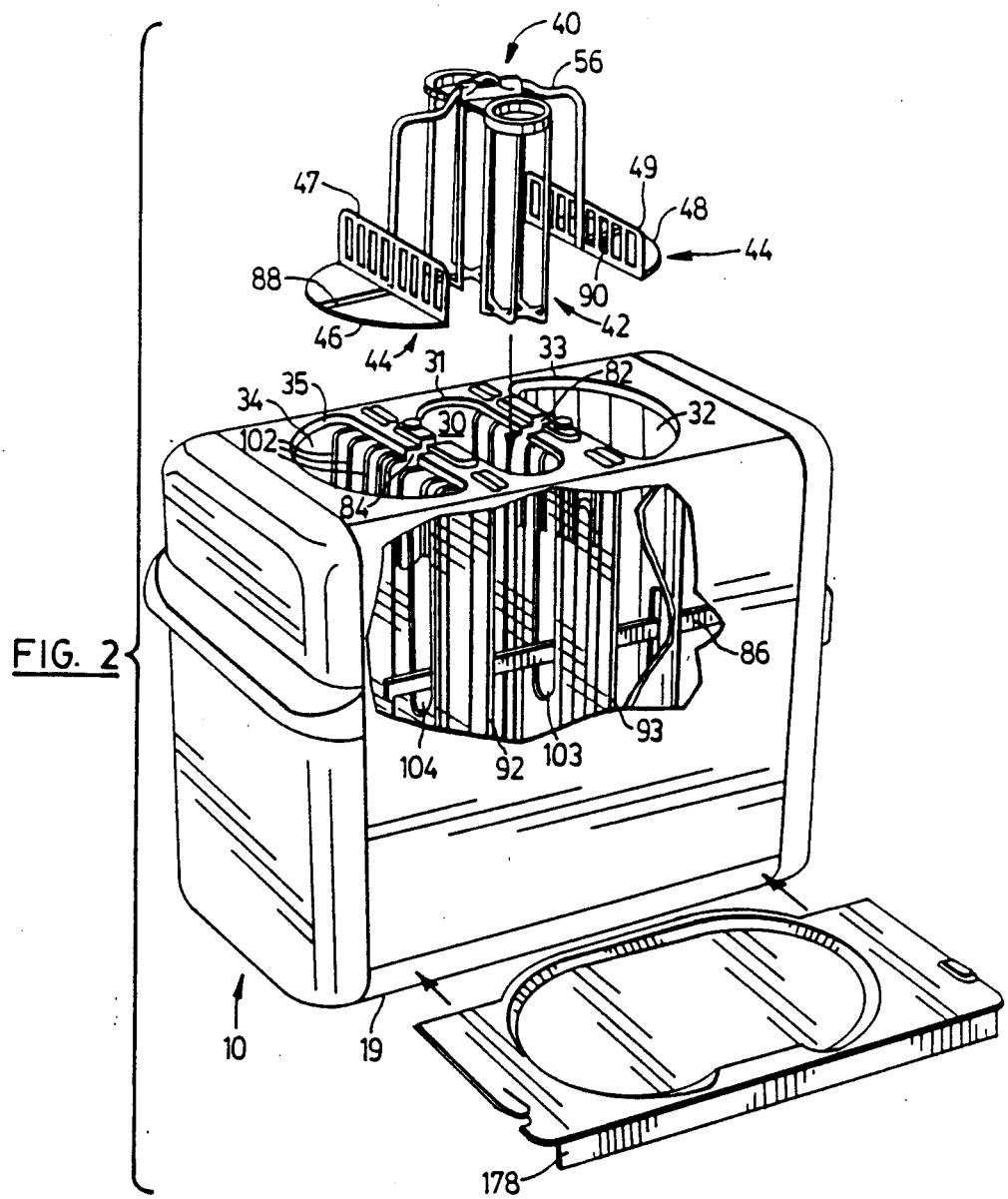
FIG. 2 is a slightly enlarged perspective view of the toaster of FIG. 1 shown in cut-away section and shown together with an elevator and a tray.

Returning to FIG. 2, slots 104 are formed in each of the panels 92, 93 of the chambers 30, 32, 34 to enable the horizontal bar 86 to extend into all of the chambers 30, 32, 34 and to be free to move up and down. A spring, not shown in FIG. 2, is associated with the horizontal bar 86 and biases the bar 86 into the raised position. At one end of the bar 86 is attached the knob 22 shown in FIG. 1. By depressing the knob 22, the horizontal bar 86 is also depressed, thereby lowering the elevator fully into the heating chambers 30, 32 and 34.

Figure 6:
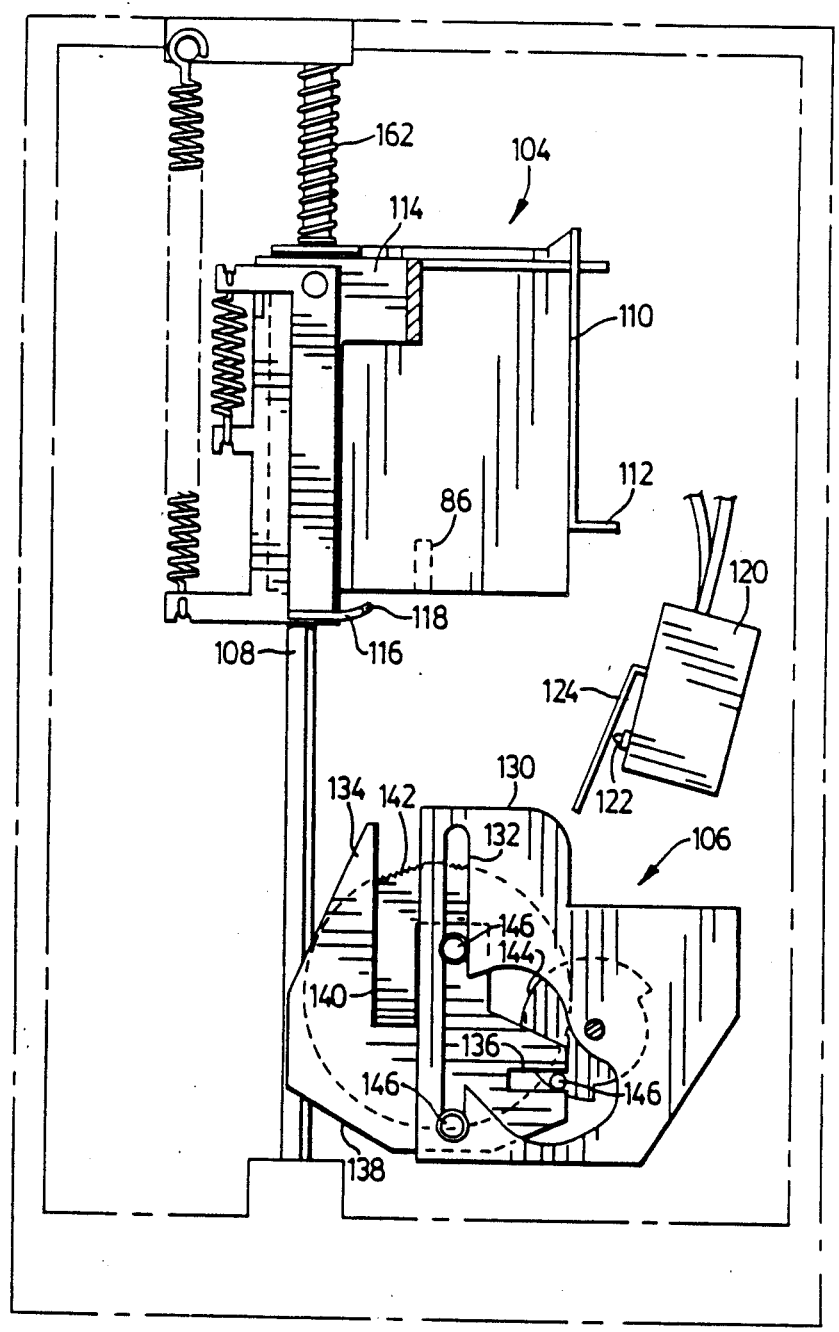
FIG. 6 is an end view of a catch and release mechanism for the toaster of FIG. 1.

Turning to FIG. 6, there is shown an end view of a catch mechanism indicated generally at 104 and a timing and release mechanism indicated generally at 106. The catch mechanism rides vertically upon a post 108 and can be lowered to engage the release mechanism 106 in a manner described below. The catch mechanism 104 is comprised of two parts, which are slideable relative to each other along the post 108. The first part is identified at 110. The first part 110 includes a flange 112. Part 110 is fixed to the horizontal bar 86 which is shown in dotted outline. The part 110 sits on a second part 114 which together make up the catch mechanism 104. The second part 114 includes a curved foot 116 with a toe 118. The first part 110 is nested on top of the second part 114.

Also shown in FIG. 6 is an electrical relay 120 with a contact 122 and a plate 124. When the catch mechanism 104 is lowered on the post 108 by means of depressing the handle 22 the flange 112 contacts the plate 124 thereby pushing the plate 124 into contact with contact 122. This completes the electrical connection for the relay 120 thereby allowing electrical power to be directed to the elements 94. This is illustrated in FIG. 7.

Turning now to the release mechanism 106, there are shown a number of components. The first component is a guide plate 130 which is fixed to the toaster 10. The guide plate 130 has a vertical slot 132 as shown. Behind the guide plate 132 is a moveable plate 134. The moveable plate 134 has a horizontal slot 136 and the cam face 138. A notch 140 is also provided for the horizontal bar 86. Behind the moveable plate 134 is a toothed wheel 142 and a smaller wheel 144. The smaller wheel has a pin 146 which fits into the horizontal slot 136. The smaller wheel 144 is rotatable and upon rotation of the wheel 144 the moveable plate 134 is raised and lowered. The travel of the moveable plate 134 is controlled by means of studs 146 which slide in vertical slot 132.

The toothed wheel 142 is attached to a spring and gear mechanism (not shown) which provides that the tooth wheel will rotate at a constant speed under a specific loading.

Figure 7:
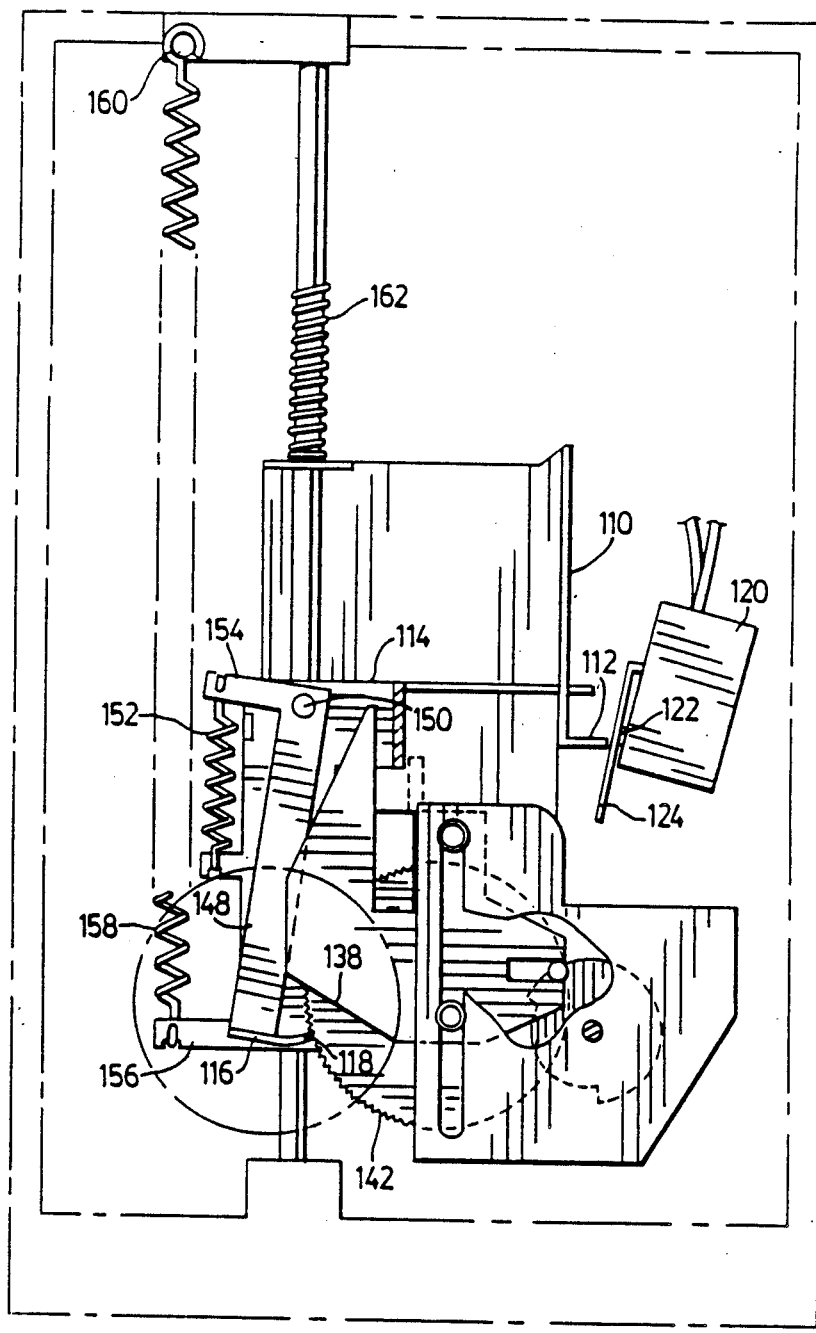
FIG. 7 is an end view of the catch and release mechanism of FIG. 6 shown in a lowered position.
Figure 8:
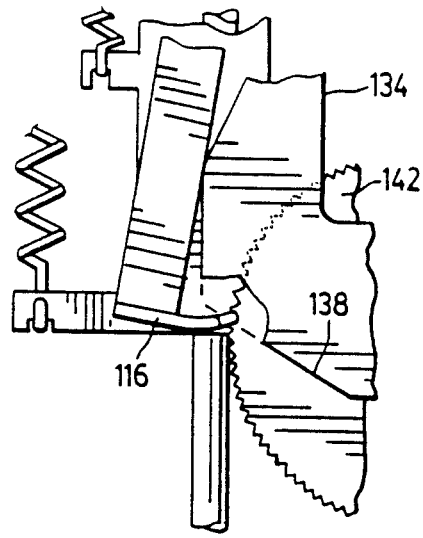
FIG. 8 is a close up view of a portion of the mechanism of FIGS. 6 and 7 in an about to be released position.
Figure 9:
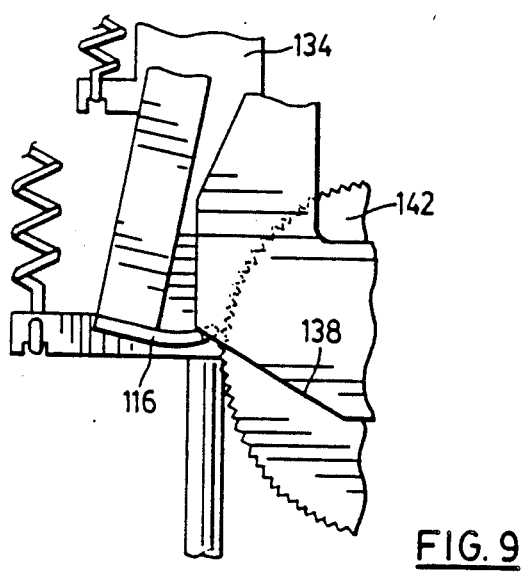
FIG. 9 is a close up view of the portion of the mechanism of FIG. 8 in a just released position.

Turning now to FIG. 7, it can be seen that the handle 22 has been displaced to the lowered position. The first part 110 is now closing the electrical contact 122. The second part 114 has been lowered the further amount and the toe 118 of the curved foot 116 is engaging the toothed wheel 142. From FIG. 7 it can be seen that the curved foot 116 is on the end of a rotatable arm 148 which is pinned at 150. A spring 152 on a short arm 154 biases the toe 118 into the toothed wheel 142. The second part 114 also has another arm 156 to which is attached a spring 158. The other end of spring 158 is attached to the toaster 10 at 160. In the configuration shown in FIG. 7, the spring 158 is urging the second part 114 upwardly, while at the same time the spring 152 is urging the toe 118 into engagement with the toothed wheel 142. In this configuration the toothed wheel 142 is being rotated at a constant speed Turning to FIG. 8, it can be seen that after the toothed wheel 142 has rotated a certain amount, the curved foot 116 of the second part 114 comes into contact with the cam face 138 of the moveable plate 134. As the foot 116 slides along the cam face 138, the toe 118 is withdrawn from the teeth of the toothed wheel 142, thereby allowing the spring 58 to draw the second part 114 up, which in turn carries the first part 110 upwardly. As a result of the sudden disengagement of the toe 118 (shown in FIG. 9), the catch mechanism tends to pop upwardly. Consequently, a cushioning spring 162 is provided between the top of the first part 110 and the toaster on post 108. This spring 162 is shown in FIGS. 6 and 7. Of course, when the second part 114 carries up first part 110, flange 112 disengages from plate 124 which, in turn, ceases contacting contact 122, thereby breaking the electrical power circuit for the element 94.

It will now be appreciated that the length of time that the toasting elements are producing radiant heat, and the length of time that the frankfurter and the buns remain in the heating chambers can be varied by raising or lowering the point at which the foot 116 intersects the cam face 138. The cam face 138 can be raised or lowered by rotating the smaller wheel 144. On the outside of the toaster 10, the smaller wheel 144 is connected to the timer adjuster 24. In this manner, an individual using the toaster 10 can select a pre-determined amount of time that the frankfurter and/or bun is exposed to the energized heating elements thereby enabling the user of the toaster 10 to select any desired degree of toasting.

It will be appreciated by those skilled in the art that under the influence of radiant heating elements 94, the toasted frankfurters will tend to bend or buckle from their generally symmetrical shape. Consequently, to provide an elevator 40 having generally vertical movement can be difficult in that the frankfurter is likely to jam at the top opening 31. It will be appreciated from the foregoing description that a frankfurter placed in the first portion 42 will be supported for at least half its length by the cages 92, 94, and will be restrained by means of the cages 92, 94 from deflecting too much from its original symmetrical shape. To be effective, the depending cages 92, 94 must cover at least half of the length of the frankfurter and it is preferrable that the frankfurter be supported for about ¾ of its length.

Figure 4:
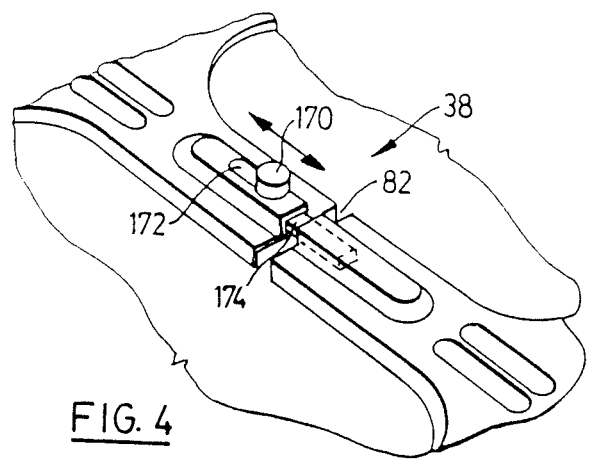
FIG. 4 is a close-up view in the direction of arrow 4 in FIG. 1.

Turning now to FIG. 4, there is shown a safety catch 38 which comprises a knob 170 sliding in a slot 172 and attached to a rod 174. The knob 170 can move the rod 174 across the channel 82 to prevent the upper portion of the link rod 50 from passing out of the toaster 10. In this manner the elevator 40 may be releasably secured within the toaster 10.

Referring to FIG. 2, there is also shown a grease drip tray 178 which is insertable between the bottom 20 and the heating chambers 30, 32 and 34. In this manner any food particles or grease that may fall from the food being heated will be caught in the tray 178 which can later be easily removed for cleaning.

It will be appreciated by those skilled in the art that the foregoing description relates to particular preferred embodiments of the present invention and that other variations are possible within the broad scope of the invention. Some of these variations have been suggested above and others will be apparent to those skilled in the art.

We claim:

1. An elevator for a toaster having both a frankfurter heating chamber and two bun heating chambers, the elevator comprising:

a first portion for supporting at least two frankfurters generally side by side between an opposed pair of heating element means in the toaster, each frankfurter being heated on two opposed sides, said first portion comprising two opposed upper rings, each of said rings having depending therefrom cages having sides and a bottom to circumferentially restrain at least a lower half of said frankfurter, and a second portion for supporting at least two buns, one in each bun heating chamber, each bun being adjacent a single heating element means, said buns being heated on only one face, said side by side orientation of said first portion being generally at right angles to an axis formed between two of said buns, one in each bun heating chamber, when supported by said second portion, and upon said elevator being placed in a toaster, and a frankfurter being placed in at least one of said cages and heated, said cage restraining deflection of said heated frankfurter to prevent jamming said elevator in said toaster.

2. The elevator of claim 1 wherein said upper rings are connected together and said first portion is in the form of a generally upside down U.

3. The elevator of claim 1 wherein said second portion comprises two generally horizontal plates for supporting the lower end of the buns, said horizontal plates being connected together.

4. The elevator of claim 3 wherein said second portion includes a linking rod of a generally upside down U-shaped configuration, said linking rod connecting said horizontal plates together, and connecting said first portion to said second portion.

5. An elevator for a toaster having both a frankfurter heating chamber and two bun heating chambers the elevator comprising:

a first portion for supporting at least two frankfurters generally side by side between an opposed pair of heating element means in the toaster, each frankfurter being heated on two opposed sides, said first portion comprising at least two opposed upper rings each of said rings having depending therefrom cages having sides and a bottom circumferentially restraining at least a lower half of said frankfurters, said cages and said rings forming a generally upside down U-shape and;

a second portion for supporting at least two buns, one in each bun heating chamber each bun being adjacent a single heating element means, said buns being heated on only one face, said second portion comprising a generally upside down U-shaped linking rod connecting two generally horizontal bun supporting plates, said second portion being connected to said first portion wherein said upside down U-shaped first portion is generally at right angles to said upside down U-shaped second portion.

6. The elevator of claims 1, 2 or 5, further including a lifting means.

7. A toaster for heating at least one frankfurter and an associated frankfurter bun, said toaster comprising:

a frankfurter heating chamber for heating at least one frankfurter supported in said frankfurter heating chamber;

at least one bun heating chamber for heating one face of a bun supported in said bun heating chamber;

at least one heating element means being interposed between said frankfurter heating chamber and said bun heating chamber, and simultaneously heating both said frankfurter and said bun, said heating element means directing more heat into said frankfurter heating chamber than in said bun heating chamber;

an elevator comprising a first portion for supporting said frankfurter in said frankfurter heating chamber, said first portion comprising two opposed upper rings, each of said rings having depending therefrom cages having sides and a bottom to circumferentially restrain at least a lower half of said frankfurter, and a second portion for supporting said bun in said bun heating chamber; and a means for raising and lowering said elevator, said elevator in a lower position supporting said frankfurter and said bun substantially within said respective frankfurter heating chamber and said bun heating chamber, and said elevator in said raised position supporting said frankfurter and said bun with at least a portion of said frankfurter and said bun projecting outwardly of said respective chambers, and upon said frankfurter being lowered and heated, said cage restraining said frankfurter from deflecting and jamming said elevator in said toaster.

8. The toaster of claim 7 further comprising one frankfurter heating chamber, two bun heating chambers, one bun heating chamber on either side of said frankfurter heating chamber, and two heating elements means, one heating element means being located between each of said frankfurter bun heating chambers and said frankfurter heating chamber and when said toaster is in use frankfurter is heated on two opposed sides by said two heating element means and a bun is heated on only one face by one or the other of the said two heating element means.

9. The toaster of claim 7 or 8 wherein each said heating element means comprises a thin wire element mounted on an insulating panel, said insulating panel having one face exposed to the bun heating chamber and the opposite face exposed to the frankfurter heating chamber, more of said thin wire element being carried by said opposite face than said one face whereby more heat is directed into said frankfurter heating chamber.

10. The toaster of claim 7 having at least one channel formed between said frankfurter heating chamber and said bun heating chamber and wherein said elevator is removable from said toaster through said channel.

11. The toaster of claim 10 further including at least one safety catch across said channel to prevent the unwanted removal of said elevator from said toaster.

12. The toaster of claim 4 wherein said means for raising and lowering said elevator is manually actuatable to said lowered position, and is retained in said lowered position by a catch means having an associated release means, and said means for raising and lowering said elevator is biased against said release means towards said raised position.

13. The toaster of claim 12 wherein said release means comprises a timer, which upon the expiration of a predetermined length of time from said elevator being placed in said lowered position releases said catch means and said means for raising and lowering said elevator is biased to said raised position, thereby raising said elevator.

14. The toaster of claim 7 wherein said heating chambers have a removeable grease tray placed thereunder, said removeable grease tray having a surface of polished steel or the like.

15. The toaster of claim 12 wherein said catch means comprises a first part, said first part having a flange, which in the lowered position closes an electrical contact to permit electricity to power said first and second element means, and a second part, said second part including a pivoting arm having a foot, and said release means includes a toothed wheel and a cam face, said foot engaging said toothed wheel when said elevator is in said lowered position, said wheel rotating at a constant speed, and said cam face disengaging said foot from said toothed wheel thereby allowing said first and second parts to be biased to said raised position.

16. The toaster of claim 15 wherein the position of said cam face is adjustable to vary the length of time said food engages said toothed wheel in said lowered position.

* * * * *